United States Patent [19]

Wong et al.

[11] Patent Number: 5,059,428
[45] Date of Patent: Oct. 22, 1991

[54] SYNERGISTIC SWEETENING COMPOSITIONS CONTAINING POLYDEXTROSE AND A CHLORODEOXYSURGAR AND METHODS FOR PREPARING SAME

[75] Inventors: Lucy L. Wong, Jackson Heights, N.Y.; Steven M. Faust, Stanhope; Subraman R. Cherukuri, Towaco, both of N.J.

[73] Assignee: Warner-Lambert Company, Morris Plains, N.J.

[21] Appl. No.: 491,898

[22] Filed: Mar. 12, 1990

[51] Int. Cl.$^5$ .................. A23G 3/30; A23G 3/00; A23L 1/22

[52] U.S. Cl. ...................... 426/3; 426/548; 426/658; 426/660; 426/804

[58] Field of Search ........................ 426/3-6, 426/658, 660, 548, 804

[56] References Cited

U.S. PATENT DOCUMENTS

| | | | |
|---|---|---|---|
| 4,343,934 | 8/1982 | Jenner | 426/548 |
| 4,435,440 | 3/1984 | Hough et al. | 426/658 |
| 4,495,170 | 1/1985 | Beyts et al. | 426/658 |
| 4,549,013 | 10/1985 | Hough et al. | 426/658 |
| 4,622,233 | 11/1986 | Torres | 426/548 |
| 4,802,528 | 4/1989 | Stroz et al. | 426/548 |
| 4,820,544 | 4/1989 | Barcelon | 426/660 |
| 4,863,752 | 9/1989 | Buzts | 426/548 |
| 4,911,937 | 3/1990 | Crosello et al. | 426/660 |
| 4,927,646 | 5/1990 | Jenner | 426/658 |
| 4,933,189 | 6/1990 | Cheruhuri et al. | 426/658 |

Primary Examiner—Jeanette Hunter
Attorney, Agent, or Firm—Craig M. Bell

[57] ABSTRACT

The present invention pertains to synergistic sweetening compositions which comprise Polydextrose and a chlorodeoxysugar derivative. The synergistic sweetening compositions may be used in a wide variety of ingestible products such as chewing gum composition, hard and soft confections, beverages, and the like. The present invention also pertains to methods for preparing the synergistic sweetening compositions and the ingestible products in which they may be used.

26 Claims, 2 Drawing Sheets

SYNERGISTIC SWEETENING COMPOSITIONS CONTAINING POLYDEXTROSE AND A CHLORODEOXYSURGAR AND METHODS FOR PREPARING SAME

BACKGROUND OF THE INVENTION

1. Field of the Invention

This invention pertains to sweetness synergy achieved by combining Polydextrose and a chlorodeoxysugar. More particularly, this invention pertains to a synergistic sweetening effect found between the combination of Polydextrose and chlorodeoxysugar derivatives such as chlorodeoxysucrose and chlorodeoxygalactosucrose derivatives. The synergistic sweetening compositions may be utilized in a wide variety of ingestible compositions. This invention also pertains to methods for preparing these synergistic sweetening compositions and the ingestible compositions in which they may be employed.

2. Description of the Prior Art

Polydextrose is a water-soluble, low-calorie, non-cariogenic bulking agent which contributes the bulk and texture normally associated with sugars in many food products. Polydextrose is a randomly bonded highly branched glucose polymer prepared by polymerizing glucose or maltose, or both, by anhydrous melt polymerization techniques using non-volatile, edible, organic polycarboxylic acids and polyols as catalysts, crosslinking agents or polymerization activators. Polydextrose has a number average molecular weight between about 1,500 and 18,000 and contains (a) from about 0.5 to about 5 mole percent of a polycarboxylic acid ester group wherein the acid is selected from the group consisting of citric, fumaric, tartaric, succinic, adipic, itaconic, and malic acids, and (b) from about 5% to about 20% by weight of an edible polyol selected from the group consisting of sorbitol, glycerol, erythritol, xylitol, mannitol, and galactitol, which is chemically bonded to the acid.

U.S. Pat. Nos. 3,766,165 and 3,876,794, issued to Rennhard, disclose procedures for preparing Polydextrose. Polydextrose is commercially available from Pfizer Chemical Company.

Polydextrose is a low-calorie sugar substitute (containing about 1 calorie per gram) which has many of the technological properties of sugar without the sweetness. This non-sweet bulking agent is especially useful when used in combination with high intensity sweeteners to provide low-calorie food products having the desirable texture of conventional sugar-containing food products without the calories associated with those products.

Polydextrose is commercially available in three forms: Polydextrose A, an amorphous, slightly acidic (pH of 2.5–3.5) fusible powder; Polydextrose N, a potassium hydroxide partially neutralized (pH of 5–6) light-colored 70% aqueous solution of Polydextrose A; and Polydextrose K, a potassium bicarbonate partially neutralized (pH of 5–6) powder form of Polydextrose A.

All of these Polydextrose products contain quantities of unreacted monomers, such as glucose, sorbitol, as well as citric acid, 1,6-anhydroglucose (levoglucosan) and 5-hydroxymethylfurfural. For example, the amount of citric acid (or citric acid salts) present in Polydextrose A is about 0.9%, by weight.

Polydextrose has recently become available in a fourth form: Improved Polydextrose, a form of Polydextrose A which is substantially free of certain low molecular weight organic acids (pH of 3–4). In general, the acids are present in the bulking agent in an amount of less than about 0.3%, by weight. Removal of these low molecular weight acids helps to eliminate the off-taste associated with Polydextrose.

Polydextrose Research Product Bulletin, Pfizer, Central Research, Groton, Connecticut (1981), p. 11, discloses that a chewing gum composition can be prepared by micronizing a mixture of Polydextrose A, sodium bicarbonate, sorbitol and an intense sweetener, adding the milled mixture to a melted gum base mixture, and then adding peppermint oil and glycerin to the mixture in portions.

Because Polydextrose is not sweet, sweetening agents, such as intense sweetening agents, must be used with Polydextrose to obtain a good tasting edible product. Intense sweetening agents (sweetener) are natural or synthetic compounds which have a greater sweetening intensity, and usually a lower caloric value, than that of sugar (sucrose). Because intense sweeteners have greater sweetening properties than sugar, smaller amounts of the sweeteners provide sweetening intensity equivalent to larger amounts of sugar. Intense sweeteners are well known in the art and are widely used as substitutes for sugar in many low calorie and/or non-cariogenic compositions.

Intense sweeteners have a wide range of chemically distinct structures and hence possess varying properties. These intense sweetener compounds include water-soluble artificial sweeteners such as 1, 2-benzisothiazol-3(2H)-one 1, 1-dioxide (saccharin and its salts), cyclohexylsulfamic acid (cyclamate and its salts), and the potassium salt of 6-methyl-1,2,3-oxathiazin-4(3H)-one-2,2-dioxide (Acesulfame-K, a commercially available product from Hoechst Celanese Corporation, Somerville, N.J.), proteins such as thaumatin (Talin, a commercially available product of Tate & Lyle Products, Reading, United Kingdom), chlorodeoxysugar derivatives (such as Sucralose, a commercially available product of McNeil Specialty Products Company, Skillman, N.J.), and dipeptides such as N-L-alpha-aspartyl-L-phenylalanine 1-methyl ester (Aspartame, a commercially available product of the Nutrasweet Company, Deerfield, Ill.) and L-alpha-aspartyl-D-alanine N-(2,2,4,4-tetramethyl-3-thietanyl)amide (Alitame, a commercially available product of Pfizer, New York, N.Y.), and dihydrochalcones. Each of these sweetening agents has a distinct sweetening intensity compared to sucrose and this sweetening intensity is well documented. For example, the following sweetening agents have the sweetening intensities set out below.

| Sweetness Intensities of Various Sweetening Agents | |
|---|---|
| COMPOUND | SWEETNESS INTENSITY* |
| 1, 2-Benzisothiazol-3(2H)-one 1, 1-dioxide (Saccharin and its salts) | 300× |
| Cyclohexylsulfamic acid (Cyclamate and its salts) | 30× |
| N-L-alpha-Aspartyl-L-phenylalanine 1-methyl ester (Aspartame) | 180×– 200× |
| Potassium salt of 6-methyl-1,2,3-oxathiazin-4(3H)-one-2,2-dioxide (Acesulfame-K) | 160× 200× |
| 4,1′,6′-Trichloro-4,1′,6′-trideoxy-galactosucrose (Sucralose) | 600× |
| L-alpha-Aspartyl-N-(2,2,4,4-tetramethyl-3-thietanyl)-D- | 2000× |

| Sweetness Intensities of Various Sweetening Agents | |
|---|---|
| COMPOUND | SWEETNESS INTENSITY* |
| alaninamide hydrate (Alitame) | |

*Compared to sucrose.

Because each intense sweetening agent is chemically distinct, each sweetener presents a different challenge with respect to the actual use of such sweetener in ingestible compositions. For example, some intense sweeteners present stability problems, such as Aspartame, which exhibits instability in the presence of aldehydes, ketones, moisture, and the like. Other intense sweeteners have an associated bitter taste or off-note such as Saccharin (a commercially available product of PMC Specialty Group Inc., Cincinnati, Ohio), stevioside, Acesulfame-K, glycyrrhizic, dipotassium glycyrrhizin, glycyrrhizic acid ammonium salt, and thaumatin (Talin).

U.S. Pat. No. 4,382,963, issued to Klose et al. and assigned to General Foods Corporation, discloses a low-calorie, sugar-free chewing gum composition wherein a flavoring agent is added to a mixture of softened gum base and spray-dried Polydextrose N bulking agent.

U.S. Pat. No. 4,765,991, issued to Cherukuri et al. and assigned to Warner-Lambert Company, discloses a reduced-calorie chewing gum composition wherein a flavoring agent is added to a mixture of a high percentage of a non-styrene-butadiene copolymer/polyvinyl acetate elastomer chewing gum base and a small percentage of a polysaccharide selected from the group consisting of Polydextrose, polymaltose, modified Polydextrose, and mixtures thereof.

U.S. patent applications Ser. Nos. 043,793 and 193,961, both of which are assigned to Warner-Lambert Company, disclose methods for purifying Polydextrose.

U.S. Pat. No. 4,622,233, issued to Torres, discloses methods for purifying Polydextrose and the preparation of a tabletop sweetener which comprises Alitame and Polydextrose.

U.S. Pat. No. 4,688,519, issued to Dartey et al. and assigned to Nabisco Brands, discloses a cookie which comprises from about 5% to about 20% Polydextrose. Polydextrose is added to replace shortening or fat and sugar to avoid lumpiness.

U.S. Pat. No. 4,631,196, issued to Zeller, discloses a low calorie dairy product which contains from 5% to 30% sugars consisting of a mixture of 10% to 90% Polydextrose and 90% to 10% fructose.

U.S. Pat. No. 4,435,440, issued to Hough et al. and assigned to Tate and Lyle plc, discloses sweetening agents which comprise chlorodeoxysugar derivatives.

U.S. Pat. No. 4,495,170, issued to Beytes et al. and assigned to Tate and Lyle plc, discloses synergistic sweetening compositions which comprise a mixture of a chlorodeoxysugar and another sweetening agent which has an associated bitter taste. The chlorodeoxysugars are selected from the group consisting of chlorodeoxysucroses and chlorodeoxygalactosucroses. The bitter tasting sweetening agent is selected from the group consisting of Saccharin, stevioside and Acesulfame-K.

U.S. patent application Ser. No. 230,282, filed Aug. 9, 1988, to Cherukuri et al. and assigned to Warner-Lambert Company, discloses synergistic sweetening compositions which comprise Sucralose and Aspartame and Sucralose and Alitame. In general, the synergistic sweetening compositions comprise Sucralose and Aspartame, or Sucralose and Alitame, in a ratio by weight from about 65:35 to about 91.7:8.3, respectively.

U.S. patent application Ser. No 264,248, filed Oct. 28, 1988, to Cherukuri et al. and assigned to Warner-Lambert Company, discloses synergistic sweetening compositions which comprise Sucralose and Maltitol.

PCT patent application serial no. WO 89/03182A, priority date Oct. 6, 1987, to Tate & Lyle plc, discloses synergistic sweetening compositions which comprise Sucralose and a saccharide bulk sweetening agent selected from the group consisting of fructose, glucose, maltose, xylitol, mannitol, and sorbitol.

European Patent Application serial no. 267,809A2 discloses synergistic sweetening compositions which comprise Sucralose and maltodextrin.

U.S. Pat. No. 4,820,528, issued to Stroz et al. and assigned to Nabisco Brands, Inc., discloses a codried composition consisting essentially of about 99.9% to 90% saccharin and about 0.1% to about 10% of a halodeoxysugar, by weight.

PCT patent application serial no. WO 89/08672A, priority date May 15, 1987, to Wm. Wrigley Jr. Company, discloses a chewing gum composition having controlled sweetness wherein the gum contains an effective amount of Sucralose.

U.S. Pat. No. 4,872,884, issued to Cherukuri et al. and assigned to Warner-Lambert Company, discloses reduced calorie chewing gums wherein soft polyvinyl acetate containing gum bases having an enhanced hydrophilic nature are employed in amounts of greater than about 50% in combination with up to about 0.60% of an intense sweetening agent and up to about 40% of a bulk sweetening agent. The gum bases are employed in major quantities to reduce the caloric content of the gums.

U.S. Pat. No. 4,698,223, issued to Perfetti et al. and assigned to Gum Base Co., SPA, discloses a no-calorie chewing gum composition which comprises from 92% to 99% of a gum base, up to 4% of glycerol, and up to 3% of a flavoring agent. The gum base comprises from 8% to 15% of an elastomer, from 10% to 30% of a hydrogenated or partially hydrogenated animal or vegetable oil, from 10% to 39% of an inert mineral filler, from 8% to 25% of polyvinyl acetate, from 4% to 9% of fatty acid glycerides, from 15% to 25% of resins, from 2% to 6% of natural gum, from 4% to 12% of wax and up to 0.05% of antioxidants.

Thus, a variety of combinations of sweetening agents and bulking agents are known which have specific sweetness intensities compared to sucrose. There is still a need, however, for sweetened bulking agents such as Polydextrose which have enhanced sweetening intensities for use in ingestible compositions. Such enhanced or synergistic sweetening compositions would permit an ingestible composition to contain a reduced total amount of sweetening composition, and would thereby reduce costs, stability problems, taste problems, and the like. The present invention provides such synergistic sweetening compositions and the sweetened ingestible compositions and chewing gum products in which the synergistic sweetening compositions may be used.

SUMMARY OF THE INVENTION

The present invention pertains to synergistic sweetening compositions which comprise Polydextrose and a chlorodeoxysugar derivative The synergistic sweetening compositions may be used in a wide variety of ingestible products such as chewing gum compositions, hard and soft confections, beverages, and the like. The present invention also pertains to methods for preparing the synergistic sweetening compositions and the ingestible products in which they may be used.

DETAILED DESCRIPTION OF THE INVENTION

The present invention pertains to synergistic sweetening compositions which comprise Polydextrose and a chlorodeoxysugar derivative. The synergistic sweetening compositions may be used in a wide variety of ingestible products such as chewing gum compositions, hard and soft confections, beverages, and the like. The present invention also pertains to methods for preparing the synergistic sweetening compositions and the ingestible products in which they may be used.

Applicants define the terms "ingestible" and "edible" to include all materials and compositions which are used by or which perform a function in the body. These include materials and compositions which are adsorbed and those which are not absorbed as well as those which are digestible and non-digestible.

The intense sweetening agents (sweeteners) in the present invention are chlorodeoxysugar derivatives. The chlorodeoxysugar derivatives may be selected from the group consisting of chlorodeoxysucrose derivatives, chlorodeoxygalactosucrose derivatives, and mixtures thereof. Examples of chlorodeoxysucrose and chlorodeoxygalactosucrose derivatives include but are not limited to:

(a) 1-chloro-1'-deoxysucrose;
(b) 4-chloro-4-deoxy-alpha-D-galactopyranosyl-alpha-D-fructofuranoside, or 4-chloro-4-deoxygalactosucrose;
(c) 4-chloro-4-deoxy-alpha-D-galactopyranosyl-1-chloro-1-deoxy-beta-D-fructofuranoside, or 4,1'-dichloro-4,1'-dideoxygalactosucrose;
(d) 1',6'-dichloro-1',6'-dideoxysucrose;
(e) 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose;
(f) 4,6-dichloro-4,6-dideoxy-alpha-D-galacto-pyranosyl-6-chloro-6-deoxy-beta-D-fructofuranoside, or 4,6,6'-trichloro-4,6,6'-trideoxygalactosucrose;
(g) 6,1',6'-trichloro-6,1',6'-trideoxysucrose;
(h) 4,6-dichloro-4,6-dideoxy-alpha-D-galacto-pyranosyl-1,6-dichloro-1,6-dideoxy-beta-D-fructofuranoside, or 4,6,1',6'-tetrachloro-4,6,1',6'-tetradeoxygalactosucrose; and
(i) 4,6,1',6'-tetrachloro-4,6,1',6'-tetradeoxysucrose.

In a preferred embodiment, the chlorodeoxysugar derivative is 4,1',6'-trichloro-4,1',6'-trideoxygalactosucrose (4-chloro-4-deoxy-alpha-D-galactopyranosyl-1,6-dichloro-1,6-dideoxy-beta-D-fructofuranoside) which is commercially available under the tradename Sucralose from McNeil Specialty Products Company, Skillman, N.J.

The intense sweetening agent of the present invention may be used in many distinct physical forms well known in the art to provide an initial burst of sweetness and/or a prolonged sensation of sweetness. Without being limited thereto, such physical forms include free forms, such as spray dried, powdered, and beaded forms, and encapsulated forms, and mixtures thereof.

The bulking agent in the present invention is Polydextrose. The bulking agent may be any of the commercially available forms of Polydextrose such as Polydextrose A, an amorphous, slightly acidic (pH of 2.5-3.5) fusible powder, Polydextrose N, a potassium hydroxide partially neutralized (pH of 5-6) light-colored 70% aqueous solution of Polydextrose A, and Polydextrose K, a potassium bicarbonate partially neutralized (pH of 5-6) powder form of Polydextrose A.

The bulking agent may also be Improved Polydextrose, a form of Polydextrose A which is substantially free of certain low molecular weight organic acids (pH of 3-4). In general, the acids are present in Improved Polydextrose in an amount of less than about 0.3%, preferably less than about 0.2%, and more preferably less than about 0.1%, by weight. Improved Polydextrose is a coarse material and has a particle size such that only about 35% of the particles are under about 125 microns in diameter.

The bulking agent may also be pulverized Improved Polydextrose having a particle size of under about 125 microns in diameter Pulverized Improved Polydextrose may be prepared from Improved Polydextrose by (a) admixing Improved Polydextrose with an anti-caking agent to form a mixture, and (b) pulverizing the mixture to form the pulverized Improved Polydextrose. Methods for preparing pulverized Improved Polydextrose are more fully described in commonly assigned U.S. patent application Ser. No. 354,650, filed May 19, 1989, which disclosure is incorporated herein by reference. The bulking agent in the present invention is preferably Improved Polydextrose.

In a preferred embodiment, the synergistic sweetening composition of the present invention comprises Polydextrose and a chlorodeoxysugar derivative wherein the chlorodeoxysugar derivative is present in an amount from about 0.05% to about 0.5%, preferably from about 0.1% to about 0.4%, and more preferably about 0.15%, by weight of the synergistic sweetening composition.

The synergistic sweetening compositions of the present invention are prepared by admixing Polydextrose and a chlorodeoxysugar derivative.

The combination of the intense sweetener and the bulking agent set out above results in a synergistic sweetening composition having an enhanced sweetness effect both in solution and in chewing gum compositions. The sweetening intensity effect of the present composition is markedly greater than that expected by the mere addition of the intense sweetener to the bulking agent. Accordingly, applicants' synergistic sweetening compositions have the advantage of requiring lower amounts of sweetener to adequately sweeten an ingestible composition.

Once prepared, the inventive synergistic sweetening composition may be stored for future use or may be formulated in effective amounts with conventional additives, such as pharmaceutically acceptable carriers or confectionery ingredients to prepare a wide variety of ingestible compositions, such as foodstuffs, beverages, powdered drinks, jellies, extracts, hard and soft confectionery products, tabletop sweeteners, orally administered pharmaceutical compositions, and hygienic products such as toothpastes, dental lotions, mouth washes and chewing gums.

The amount of the inventive synergistic sweetening composition employed in an edible composition is an effective amount to sweeten the edible composition. The exact amount of the synergistic sweetening composition employed is a matter of preference, subject to such factors as the type of carrier employed in the composition, the other ingredients in the composition, and the strength of sweetness desired. Thus, the amount of sweetener composition may be varied in order to obtain the result desired in the final product and such variations are within the capabilities of those skilled in the art without the need for undue experimentation. In general, the amount of synergistic sweetening composition normally present in an edible composition will be up to about 100%, preferably from about 10% to about 75%, and more preferably from about 20% to about 40%, by weight of the edible composition.

The present invention extends to methods of making the ingestible compositions. In such a method, a composition is made by admixing an effective amount of the synergistic sweetening composition of the present invention with a pharmaceutically acceptable carrier or confectionery material and the other ingredients of the final desired ingestible composition. Other ingredients will usually be incorporated into the composition as dictated by the nature of the desired composition as well known by those having ordinary skill in the art. The ultimate ingestible compositions are readily prepared using methods generally known in the food technology and pharmaceutical arts.

In another embodiment, the present invention is directed at a method for sweetening an edible composition which comprises admixing an effective amount of a synergistic sweetening composition with the edible composition wherein the synergistic sweetening composition comprises Polydextrose and a chlorodeoxysugar derivative.

An important aspect of the present invention includes an improved chewing gum composition incorporating the inventive synergistic sweetening composition and a method for preparing the chewing gum composition, including both chewing gum and bubble gum formulations. In general, the improved chewing gum compositions will contain a gum base, an effective amount of the inventive synergistic sweetening composition, and various additives such as a flavoring agent.

The chewing gum compositions may be reduced-calorie chewing gums employing high levels of a chewing gum base having an enhanced hydrophilic character. These reduced-calorie chewing gums will comprise a gum base present in an amount from about 50% to about 85%, preferably from about 50% to about 75%, and more preferably from about 60% to about 70%, by weight of the chewing gum composition. When a reduced-calorie product is not desired, the chewing gum composition may contain lower amounts of a chewing gum base. These chewing gums will comprise a gum base present in an amount up to about 55%, preferably from about 15% to about 40%, and more preferably from about 20% to about 35%, by weight of the chewing gum composition.

As used herein, the term "reduced-calorie composition" means a composition having a caloric value two thirds or less than that of a conventional composition. The term "tight" or "rubbery" chew refers to a chewing gum composition which requires a large amount of muscular chewing effort to masticate or to a composition which provides a gum bolus with high elasticity and bounce and which is difficult to deform.

Gum bases having an enhanced hydrophilic character include polyvinyl acetate gum bases which may also contain a low melting point wax. Such gum bases do not require a high level of bulking agent to plasticize the gum base and render it soft during chewing. These gum bases may be used at higher than normal levels in chewing gum compositions in place of a bulking and/or a bulk sweetening agent to prepare high base-low bulking agent reduced-calorie gums which do not have rubbery or tight chew characteristics. These gum bases possess increased hydrophilic properties over conventional gum bases and appear to increase in size during chewing releasing flavoring and sweetening agents which would normally be entrapped in the gum base while maintaining a soft chew texture. Reduced-calorie chewing gum compositions prepared with such gum bases in high levels are less hygroscopic (have lower moisture-pickup) and are less prone to becoming stale than conventional reduced-calorie gum compositions while having comparable firmness and texture.

The elastomers (rubbers) employed in the gum base of the present invention will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, and the like, and mixtures thereof The amount of elastomer employed in the gum base will vary greatly depending upon various factors such as the type of gum base used, the consistency of the gum composition desired and the other components used in the composition to make the final chewing gum product. In general, the elastomer will be present in the gum base in an amount from about 0.5% to about 20%, and preferably from about 2.5% to about 15%, by weight of the gum base.

The polyvinyl acetate polymer employed in the gum base of the present invention is a polyvinyl acetate polymer having a medium molecular weight, specifically, having a mean average molecular weight in the range from about 35,000 to about 55,000. This medium molecular weight polyvinyl acetate polymer will preferably have a viscosity from about 35 seconds to about 55 seconds (ASTM designation D1200–82 using a Ford cup viscometer procedure). The medium molecular weight polyvinyl acetate polymer will be present in the gum base in an amount from about 10% to about 25%, and preferably from about 12% to about 27%, by weight of the gum base.

The medium molecular weight polyvinyl acetate polymer may also be blended with a low molecular weight polyvinyl acetate polymer. The low molecular weight polyvinyl acetate polymer will have a mean average molecular weight in the range from about 12,000 to about 16,000. This low molecular weight polyvinyl acetate polymer will preferably have a viscosity from about 14 seconds to about 16 seconds (ASTM designation D1200-82 using a Ford cup viscometer procedure). The low molecular weight polyvinyl acetate polymer will be present in the gum base in an amount up about 17%, and preferably from about 12% to about 17%, by weight of the gum base.

When a low molecular weight polyvinyl acetate polymer is blended with a medium molecular weight polyvinyl acetate polymer, the polymers will be present in a mole ratio from about 1:0.5 to about 1:1.5, respectively.

The medium molecular weight polyvinyl acetate polymer may also be blended with a high molecular weight polyvinyl acetate polymer. The high molecular weight polyvinyl acetate polymer will have a mean average molecular weight in the range from about 65,000 to about 95,000. The high molecular weight polyvinyl acetate polymer will be present in the gum base in an amount up to about 5%, 'y weight of the gum base.

The acetylated monoglycerides in the present invention, like the polyvinyl acetate polymer, serve as plasticizing agents. While the saponification value of the acetylated monoglycerides is not critical, preferable saponification values are 278 to 292, 316 to 331, 370 to 380, and 430 to 470. A particularly preferred acetylated monoglyceride has a saponification value above about 400. Such acetylated monoglycerides generally have an acetylation value (percentage acetylated) above about 90 and a hydroxyl value below about 10 (Food Chemical Codex (FCC) III/P508 and the revision of AOCS).

The use of acetylated monoglycerides in the present gum base is preferred over the use of bitter polyvinyl acetate (PVA) plasticizers, in particular, triacetin. The acetylated monoglycerides will be present in the gum base in an amount from about 4.5% to about 10%, and preferably from about 5% to about 9%, by weight of the gum base.

The wax in the gum base of the present invention softens the polymeric elastomer mixture and improves the elasticity of the gum base. The waxes employed will have a melting point below about 60° C., and preferably between about 45° C. and about 55° C. A preferred wax is low melting paraffin wax. The wax will be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnauba wax, most petroleum waxes, and the like, and mixtures thereof.

In addition to the components set out above, the gum base includes a variety of traditional ingredients, such as a component selected from the group consisting of elastomer solvents, emulsifiers, plasticizers, fillers, and mixtures thereof. These ingredients are present in the gum base in an amount to bring the total amount of gum base to 100%.

The gum base may contain elastomer solvents to aid in softening the elastomer component. Such elastomer solvents may comprise those elastomer solvents known in the art, for example, terpinene resins such as polymers of alpha-pinene or beta-pinene, methyl, glycerol and pentaerythritol esters of rosins and modified rosins and gums, such as hydrogenated, dimerized and polymerized rosins, and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifiers which aid in dispersing the immiscible components into a single stable system. The emulsifiers useful in this invention include glyceryl monostearate, lecithin, fatty acid monoglycerides, diglycerides, propylene glycol monostearate, and the like, and mixtures thereof. A preferred emulsifier is glyceryl monostearate. The emulsifier may be employed in amounts from about 2% to about 15%, and preferably from about 7% to about 11%, by weight of the gum base.

The gum base may also include plasticizers or softeners to provide a variety of desirable textures and consistency properties. Because of the low molecular weight of these ingredients, the plasticizer and softeners are able to penetrate the fundamental structure of the gum base making it plastic and less viscous. Useful plasticizers and softeners include lanolin, palmitic acid, oleic acid, stearic acid, sodium stearate, potassium stearate., glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20%, and preferably in amounts from about 9% to about 17%, by weight of the gum base.

Preferred plasticizers are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and preferably in amounts from about 5% to about 13.5%, by weight of the gum base.

In another preferred embodiment, the softening agent is anhydrous glycerin, such as the commercially available U.S. Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be present in an amount from about 15% to about 40%, and preferably from about 20% to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

The manner in which the gum base components are admixed is not critical and is performed using standard techniques and apparatus known to those skilled in the art. In a typical method, an elastomer is admixed with an elastomer solvent and/or a plasticizer and/or an emulsifier and agitated for a period of from 1 to 30 minutes. After blending is complete, the polyvinyl acetate component is admixed into the mixture. The medium molecular weight polyvinyl acetate is preferably admixed prior to addition of the optional low molecular weight polyvinyl acetate to prevent the creation of pockets of polyvinyl acetate within the elastomer mixture. The remaining ingredients, such as the low melting point wax, are then admixed, either in bulk or incrementally, while the gum base mixture is blended again for 1 to 30 minutes.

In one embodiment, the invention pertains to a reduced-calorie chewing gum composition which comprises a gum base present in an amount from about 40% to about 75%, by weight of the chewing gum composition, which comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6% to about 10%, by weight of the gum base, and (e) a material selected from the group consisting of elastomer solvents, emulsifiers, plasticizers, fillers, and mixtures thereof, present in an amount to bring the total amount of gum base to 100%, by weight of the gum base.

Chewing gum compositions employing a high level of a chewing gum base having an enhanced hydrophilic character are more fully described in U.S. Pat. No. 4,872,884, filed Dec. 10, 1986, which disclosure is incorporated herein by reference.

Other gum bases having an enhanced hydrophilic nature and suitable for use in reduced-calorie chewing gum compositions in high levels may also be employed in the present invention. In general, these gum bases may be employed in amounts up to 99%, preferably from about 40% to about 85%, and more preferably from about 40% to about 75%, by weight of the chewing gum composition. Suitable gum bases having an enhanced hydrophilic nature include, for example, those disclosed in U.S. Pat. No. 4,698,223, which disclosure is incorporated herein by reference. The gum base is formulated with the inventive synergistic sweetening composition and conventional additives such as a bulking agent to prepare a wide variety of sweetened chewing gum compositions.

The amount of gum base employed in the chewing gum composition will vary depending on such factors as the type of gum base used, the consistency desired, and the other components used to make the final chewing gum product. In general, the gum base having an enhanced hydrophilic character will be present in the chewing gum composition in an amount from about 50% to about 85%, preferably from about 50% to about 75%, and more preferably from about 60% to about 70%, by weight of the chewing gum composition.

In another embodiment, the invention pertains to a chewing gum composition which contains lower amounts of a chewing gum base. In general, the gum base in these chewing gum compositions will be present in an amount up to about 55%, preferably from about 15% to about 40%, and more preferably from about 20% to about 35%, by weight of the chewing gum composition. In this embodiment, the gum base will comprise an elastomer and a variety of traditional ingredients such as an elastomer solvent, waxes, emulsifiers, plasticizers or softeners, bulking agents such as mineral adjuvants which may serve as fillers and textural agents, coloring agents, antioxidants, preservatives, flavoring agents, and the like, and mixtures thereof. Illustrative examples of these gum base components have been set out above.

Once prepared, the gum base may be formulated with the synergistic sweetening composition of the present invention and conventional additives to prepare a wide variety of chewing gum compositions.

In addition to the Polydextrose bulking agent of the present invention, the chewing gum composition may include other bulking agents. These bulking agents (carriers, extenders) may be water-soluble and include bulking agents selected from the group consisting of, but not limited to, monosaccharides, disaccharides, polysaccharides, sugar alcohols, and mixtures thereof; isomalt (a racemic mixture of alpha-D-glucopyranosyl-1,6mannitol and alpha-D-glucopyranosyl-1,6-sorbitol manufactured under the tradename Palatinit by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the and the like, and mixtures thereof. Bulking agents may be used in amounts up to about 60%, and preferably in amounts from about 25% to about 60%, by weight of the chewing gum composition.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. Mixtures of sucrose and corn syrup solids are the preferred sugar bulking agents.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, non-caloric, water-soluble sugar alcohol useful as a bulking agent in the preparation of non-caloric beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The gum composition may include effective amounts of conventional additives selected from the group consisting of plasticizers, softeners, emulsifiers, waxes, fillers, mineral adjuvants, flavoring agents (flavors, flavorings), coloring agents (colorants, colorings), antioxidants, acidulants, thickening agents, and the like, and mixtures thereof. These ingredients are present in the chewing gum composition in an amount to bring the total amount of chewing gum composition to 100%. Some of these additives may serve more than one purpose. For example, in sugarless gum compositions, a sweetener, such as sorbitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifiers, such as lecithin and glyceryl monostearate, thickening agents, used alone or in combination with other softeners, such as methyl cellulose, alginates, carrageenan, xanthan gum, gelatin, carob, tragacandth, and locust bean, acidulants such as malic acid, adipic acid, citric acid, tartaric acid, fumaric acid, and mixtures thereof, and fillers, such as those discussed above under the category of mineral adjuvants.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in Chemicals Used in Food Processing, publication 1274, pages 63-258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

Encapsulated delivery systems for flavoring agents or sweetening agents comprise a hydrophobic matrix of fat or wax surrounding a sweetening agent or flavoring agent core. The fats may be selected from any number of conventional materials such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Glycerides which are useful include monoglycerides, diglycerides, and triglycerides.

Waxes useful may be chosen from the group consisting of natural and synthetic waxes, and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes may be use individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent or sweetening agent delivery systems are disclosed in U.S. Pat. Nos. 4,597,970 and 4,722,845, which disclosures are incorporated herein by reference.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfoniumbenzylamino) diphenylmethylene]-[1-(N-ethyl -N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857-884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

In accordance with this invention, effective amounts of the synergistic sweetening composition of the present invention may be admixed into the chewing gum composition. As set out above, the synergistic sweetening compositions of the present invention comprise Polydextrose and a chlorodeoxysugar derivative. The exact amount of synergistic sweetening composition employed is normally a matter of preference subject to such factors as the particular type of gum composition being prepared, the type of bulking agent employed, the type of flavor employed and the intensity of sweetness desired. Thus, the amount of synergistic sweetening composition may be varied in order to obtain the result desired in the final product and such variations are within the capabilities of those skilled in the art without the need for undue experimentation. In general, the amount of synergistic sweetening composition normally present in a chewing gum composition will be up to about 85%, preferably up to about 50%, and more preferably up to about 30%, by weight of the chewing gum composition.

The present invention also includes a method for preparing the improved chewing gum compositions, including both chewing gum and bubble gum formulations. The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the gum base with the synergistic sweetening composition and the other ingredients of the final desired chewing gum composition. Other ingredients will usually be incorporated into the composition as dictated by the nature of the desired composition as well known by those having ordinary skill in the art. The ultimate chewing gum compositions are readily prepared using methods generally known in the food technology and chewing gum arts.

For example, the gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the gum composition such as the inventive sweetener composition, plasticizer, the softener, the bulking agent, and/or fillers, coloring agents and flavoring agents to plasticize the blend as well as to modulate the hardness, viscoelasticity and formability of the base. Mixing is continued until a uniform mixture of gum composition is obtained. Thereafter the gum composition mixture may be formed into desirable chewing gum shapes.

Another important aspect of the present invention includes a sweetened confectionery composition incorporating the inventive synergistic sweetening composition and a method for preparing the sweetened confectionery compositions. The preparation of confectionery formulations is historically well known and has changed little through the years. Confectionery items have been classified as either "hard" confectionery or "soft" confectionery. The synergistic sweetening compositions of the present invention can be incorporated into the confections by admixing the inventive composition into the conventional hard and soft confections.

Hard confectionery may be processed and formulated by conventional means. In general, a hard confectionery has a base composed of a mixture of sugar and other carbohydrate bulking agents kept in an amorphous or glassy condition. This form is considered a solid syrup of sugars generally having from about 0.5% to about 1.5% moisture. Such materials normally contain up to about 92% corn syrup, up to about 55% sugar and from about 0.1% to about 5% water, by weight of the final composition. The syrup component is generally prepared from corn syrups high in fructose, but may include other materials. Further ingredients such as flavorings, sweeteners, acidulants, colorants and so forth may also be added.

Such confectionery may be routinely prepared by conventional methods such as those involving fire cookers, vacuum cookers, and scraped-surface cookers also referred to as high speed atmospheric cookers.

Fire cookers involve the traditional method of making a candy base. In this method, the desired quantity of carbohydrate bulking agent is dissolved in water by heating the agent in a kettle until the bulking agent dissolves. Additional bulking agent may then be added and cooking continued until a final temperature of 145° C. to 156° C. is achieved. The batch is then cooled and worked as a plastic-like mass to incorporate additives such as flavors, colorants and the like.

A high-speed atmospheric cooker uses a heat-exchanger surface which involves spreading a film of candy on a heat exchange surface, the candy is heated to 165° C. to 170° C. in a few minutes. The candy is then rapidly cooled to 100° C. to 120° C. and worked as a plastic-like mass enabling incorporation of the additives, such as flavors, colorants and the like.

In vacuum cookers, the carbohydrate bulking agent is boiled to 125° C. to 132° C., vacuum is applied and additional water is boiled off without extra heating. When cooking is complete, the mass is a semi-solid and has a plastic-like consistency. At this point, flavors, colorants, and other additives are admixed in the mass by routine mechanical mixing operations.

The optimum mixing required to uniformly mix the flavors, colorants and other additives during conventional manufacturing of hard confectionery is determined by the time needed to obtain a uniform distribution of the materials. Normally, mixing times of from 4 to 10 minutes have been found to be acceptable.

Once the candy mass has been properly tempered, it may be cut into workable portions or formed into desired shapes. A variety of forming techniques may be utilized depending upon the shape and size of the final product desired. A general discussion of the composition and preparation of hard confections may be found in H. A. Lieberman, *Pharmaceutical Dosage Forms: Tablets,* Volume 1 (1980), Marcel Dekker, Inc., New York, N.Y. at pages 339 to 469, which disclosure is incorporated herein by reference.

The apparatus useful in accordance with the present invention comprises cooking and mixing apparatus well known in the confectionery manufacturing arts, and therefore the selection of the specific apparatus will be apparent to the artisan.

In contrast, compressed tablet confections contain particular materials and are formed into structures under pressure. These confections generally contain sugars in amounts up to about 95%, by weight of the composition, and typical tablet excipients such as binders and lubricants as well as flavors, colorants and so forth.

Similar to hard confectionery, soft confectionery may be utilized in this invention. The preparation of soft confections, such as nougat, involves conventional methods, such as the combination of two primary components, namely (1) a high boiling syrup such as a corn syrup, or the like, and (2) a relatively light textured frappe, generally prepared from egg albumin, gelatin, vegetable proteins, such as soy derived compounds, sugarless milk derived compounds such as milk proteins, and mixtures thereof. The frappe is generally relatively light, and may, for example, range in density from about 0.5 to about 0.7 grams/cc.

The high boiling syrup, or "bob syrup" of the soft confectionery is relatively viscous and has a higher density than the frappe component, and frequently contains a substantial amount of carbohydrate bulking agent such as a Polydextrose. Conventionally, the final nougat composition is prepared by the addition of the "bob syrup" to the frappe under agitation, to form the basic nougat mixture. Further ingredients such as flavoring, additional carbohydrate bulking agent, colorants, preservatives, medicaments, mixtures thereof and the like may be added thereafter also under agitation. A general discussion of the composition and preparation of nougat confections may be found in B. W. Minifie, *Chocolate, Cocoa and Confectionery: Science and Technology,* 2nd edition, AVI Publishing Co., Inc., Westport, Conn. (1980), at pages 424–425, which disclosure is incorporated herein by reference.

The procedure for preparing the soft confectionery involves known procedures. In general, the frappe component is prepared first and thereafter the syrup component is slowly added under agitation at a temperature of at least about 65° C., and preferably at least about 100° C. The mixture of components is continued to be mixed to form a uniform mixture, after which the mixture is cooled to a temperature below 80° C., at which point, the flavor may be added. The mixture is further mixed for an additional period until it is ready to be removed and formed into suitable confectionery shapes.

In accordance with this invention, effective amounts of the synergistic sweetening compositions of the present invention may be admixed into the hard and soft confections. As set out above, the synergistic sweetening composition of the present invention comprises Polydextrose and a chlorodeoxysugar derivative. The exact amount of synergistic sweetening composition may be varied in order to obtain the result desired in the final product and such variations are within the capabilities of those skilled in the art without the need for undue experimentation. The exact amount of synergistic sweetening composition employed is normally a matter of preference subject to such factors as the particular type of confection being prepared, the type of bulking agent or carrier employed, the type of flavor employed and the intensity of sweetness desired. Thus, the amount of synergistic sweetening composition may be varied in order to obtain the result desired in the final product and such variations are within the capabilities of those skilled in the art without the need for undue experimentation. In general, the amount of synergistic sweetening composition normally present in a hard or soft confection will be up to about 100%, preferably from about 50% to about 98%, and more preferably from about 60% to about 85%, by weight of the confection.

The present invention extends to methods of making the improved sweetened confections. The synergistic sweetening compositions may be incorporated into an otherwise conventional hard or soft confection composition using standard techniques and equipment known to those skilled in the art. The apparatus useful in accordance with the present invention comprises mixing and heating apparatus well known in the confectionery manufacturing arts, and therefore the selection of the specific apparatus will be apparent to the artisan.

In such a method, a composition is made by admixing the inventive synergistic sweetening composition into the confectionery composition along with the other ingredients of the final desired composition. Other ingredients will usually be incorporated into the composition as dictated by the nature of the desired composition as well known by those having ordinary skill in the art. The ultimate confectionery compositions are readily prepared using methods generally known in the food technology and pharmaceutical arts. Thereafter the confectionery mixture may be formed into desirable confectionery shapes.

The synergistic sweetening compositions may be formulated with conventional ingredients which offer a variety of textures to suit particular applications. Such ingredients may be in the form of hard and soft confections, tablets, toffee, nougat, chewy candy, chewing gum and so forth, both sugar and sugarless. The acceptable ingredients may be selected from a wide range of materials. Without being limited thereto, such materials include diluents, binders and adhesives, lubricants, disintegrants, bulking agents, humectants and buffers and adsorbents. The preparation of such confections and chewing gum products is well known.

The present invention is further illustrated by the following examples which are not intended to limit the effective scope of the claims. All parts and percentages in the examples and throughout the specification and claims are by weight of the final composition unless otherwise specified.

EXAMPLES 1-4

These examples demonstrate a comparison of the sweetness intensity contributions of various intense sweeteners at equivalent sweetness levels with Improved Polydextrose.

Initial stock aqueous solutions of Sodium Saccharin, Acesulfame-K, Aspartame, and Sucralose were prepared. Sodium Saccharin was prepared as a 0.4% solution, Acesulfame-K was prepared as a 0.6% solution, Aspartame was prepared as a 0.6% solution, and Sucralose was prepared as a 0.2% solution. These stock sweetener solutions were prepared having identical sucrose equivalents (equivalent sweetness intensities). The stock solutions were then combined in a 1:1 ratio with a 50% solution of Improved Polydextrose in water to formulate the test solutions employed in Examples 1-4 having the following concentrations:

| | |
|---|---|
| 0.2% Sodium Saccharin | (60 sucrose equivalents) |
| 0.3% Acesulfame-K | (60 sucrose equivalents) |
| 0.3% Aspartame | (60 sucrose equivalents) |
| 0.1% Sucralose | (60 sucrose equivalents) |

The test solutions in Examples 1-4 had the compositions set out in Table 1.

TABLE 1

SWEETENING AGENT COMBINATIONS IN SOLUTION

| Ingredient | Examples (Percent by Weight) | | | |
|---|---|---|---|---|
| | 1 | 2 | 3 | 4 |
| Improved Polydextrose | 25% | 25% | 25% | 25% |
| Sodium Saccharin | 0.2% | — | — | — |
| Acesulfame-K | — | 0.3% | — | — |
| Aspartame | — | — | 0.3% | — |
| Sucralose | — | — | — | 0.1% |
| Average Sweetness | 47 | 55 | 70 | 80 |

On a relative scale of sucrose=1, Sodium Saccharin=300X, Acesulfame-K=160-200X, Aspartame=180X-200X, and Sucralose=600X, the above set forth percentages of intense sweetening agents in the solutions of Examples 1-4 should produce equivalent sweetening intensity contributions. This was found not to be the case.

An expert taste panel evaluated the relative sweetening intensity of the solutions of Examples 1-4 (on a scale of 0-100, 0 being not sweet, and 100 being very sweet) in random order and the findings were pooled and averaged. The results from the taste panel are depicted in bar graph format in FIG. 1.

Figure 1:
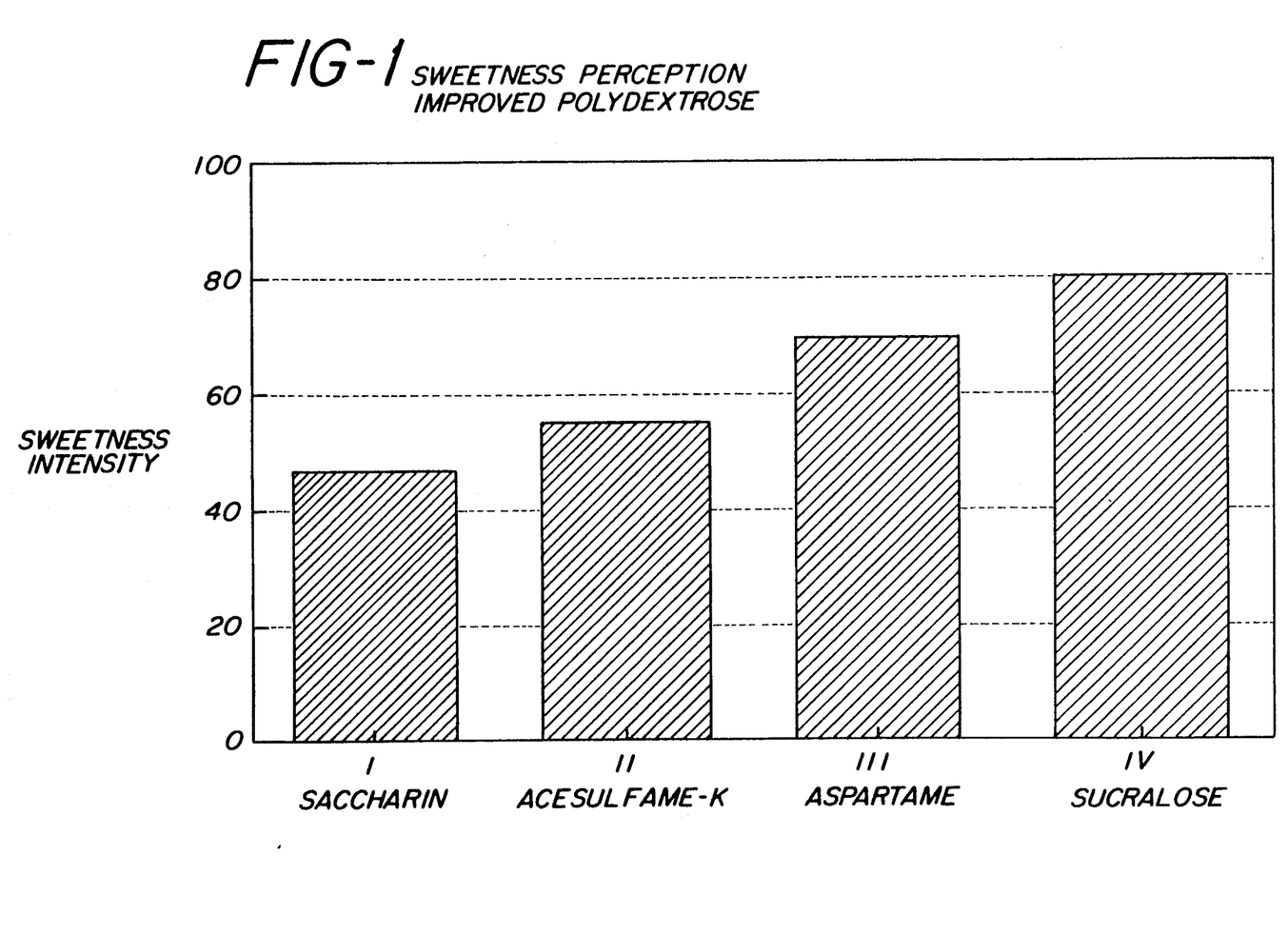
FIG. 1 depicts in bar graph format the sweetness intensities found for various combinations of intense sweeteners at equivalent sweetness levels with Polydextrose (Examples 1-4).

FIG. 1 shows that the sweetness intensity contribution of the combination of Polydextrose and Sucralose in solution of Example 4 is higher than the expected value. Hence, the solution of Example 4 possesses enhanced sweetening intensity, meaning a synergy of sweetness effect exists between Polydextrose and Sucralose.

EXAMPLES 5-9

These examples demonstrate a comparison of the sweetness intensity contributions of various intense sweeteners at equivalent sweetness levels with Improved Polydextrose in chewing gum compositions.

The chewing gum compositions of Examples 5-9 were prepared containing only Improved Polydextrose, and Improved Polydextrose with each of the following four intense sweeteners: Sodium Saccharin, Acesulfame-K, Aspartame and Sucralose. The compositions of the chewing gums of Examples 5-9 are set out in Table 2. The chewing gums were prepared by conventional chewing gum manufacturing techniques.

TABLE 2

SWEETENING AGENT COMBINATIONS IN CHEWING GUM COMPOSITIONS

| Ingredient | Examples (Percent by Weight) | | | | |
|---|---|---|---|---|---|
| | 5 | 6 | 7 | 8 | 9 |
| Gum base | 68.0 | 68.0 | 68.0 | 68.0 | 68.0 |
| Softener | 5.2 | 5.2 | 5.2 | 5.2 | 5.2 |
| Flavors | 2.5 | 2.5 | 2.5 | 2.5 | 2.5 |
| Improved Polydextrose | 24.30 | 24.00 | 23.85 | 23.85 | 24.15 |
| Sodium Saccharin | — | 0.30 | — | — | — |
| Acesulfame-K | — | — | 0.45 | — | — |
| Aspartame | — | — | — | 0.45 | — |
| Sucralose | — | — | — | — | 0.15 |

An expert sensory chew panel having experience in the organoleptic evaluation of ingestible products, including chewing gums, evaluated the relative sweetening intensity of the chewing gum compositions of Examples 5-9, inclusive, at 30 seconds, 1 minute, 2 minutes and 6 minutes (on a scale of 0-100, 0 being not sweet, and 100 being very sweet) in random order and the findings were pooled and averaged. The findings are graphically depicted in FIG. 2.

Figure 2:
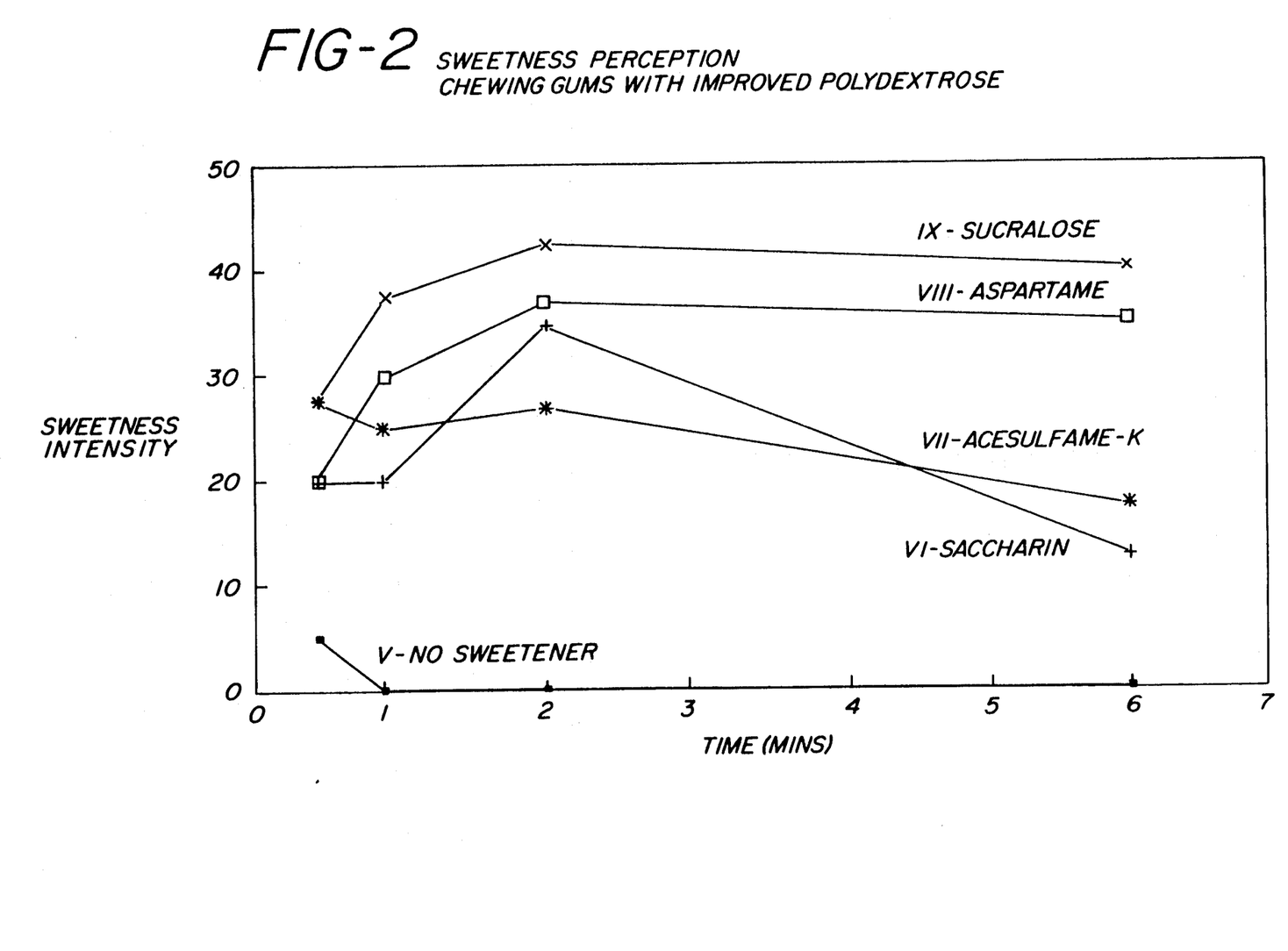
FIG. 2 depicts in graphic format the sweetness intensities found for various combinations of intense sweeteners at equivalent sweetness levels with Polydextrose in chewing gum compositions at different chew out times (Examples 5-9).

FIG. 2 shows that the chewing gum composition of Example 5, which contained Polydextrose and no intense sweetener, was judged to have no sweetness. FIG. 2 also shows that the contribution of sweetness of Sucralose and Polydextrose in chewing gum (Example 9) was higher than the contribution of sweetness of Sodium Saccharin, Acesulfame-K or Aspartame and Polydextrose in chewing gum (Examples 6-8). Hence, the chewing gum composition of Example 9 possesses enhanced sweetening intensity, meaning a synergy of sweetness effect exists between Polydextrose and Sucralose in chewing gum.

The invention being thus described, it will be obvious that the same may be varied in many ways. Such variations are not to be regarded as a departure from the spirit and scope of the invention and all such modifications are intended to be included within the scope of the following claims.

We claim:

1. A synergistic sweetening composition which consisting essentially of polydextrose and a chlorodeoxysugar derivative, wherein the chlorodeoxysugar derivative is present in an amount from about 0.05% to about 0.5%, by weight of the synergistic sweetening composition.

2. The synergistic sweetening composition according to claim 1, wherein the chlorodeoxysugar derivative is selected from the group consisting of chlorodeoxysucrose derivatives, chlorodeoxygalactosucrose derivatives, and mixtures thereof.

3. The synergistic sweetening composition according to claim 2, wherein the chlorodeoxysugar derivative is 4,1',6'-trichloro-4,1',6'-trideoxygalactosucrose.

4. The synergistic sweetening composition according to claim 1, wherein the chlorodeoxysugar derivative is present in an amount from about 0 1% to about 0.4%, by weight of the sweetening composition.

5. The synergistic sweetening composition according to claim 1, wherein the Polydextrose is Improved Polydextrose.

6. An edible composition which comprises a pharmaceutically acceptable carrier and an effective amount of a synergistic sweetening composition wherein the synergistic sweetening composition consisting essentially of polydextrose and a chlorodeoxysugar derivative, wherein the chlorodeoxysugar derivatives is present in an amount from about 0.05% to about 0.5%, by weight of the synergistic sweetening composition.

7. The edible composition according to claim 6, wherein the chlorodeoxysugar derivative is selected from the group consisting of chlorodeoxysucrose derivatives, chlorodeoxygalactosucrose derivatives, and mixtures thereof.

8. The edible composition according to claim 7, wherein the chlorodeoxysugar derivative is 4,1',6'-trichloro-4,1',6'-trideoxygalactosucrose.

9. The edible composition according to claim 6, wherein the Polydextrose is Improved Polydextrose.

10. The edible composition according to claim 6, wherein the synergistic sweetening composition is present in the edible composition in an amount from about 10% to about 75%, by weight of the edible composition.

11. A sweetened chewing gum composition which consisting essentially of
 (a) a gum base;
 (b) an effective amount of a synergistic sweetening composition which comprises polydextrose and a chlorodeoxysugar derivative, wherein the chlorodeoxysugar derivative is present in an amount from about 0.05% to about 0.5%, by weight of the synergistic sweetening composition; and
 (c) a flavoring agent.

12. The sweetened chewing gum composition according to claim 11, wherein the chlorodeoxysugar derivative is selected from the group consisting of chlorodeoxysucrose derivatives, chlorodeoxygalactosucrose derivatives, and mixtures thereof.

13. The sweetened chewing gum composition according to claim 12, wherein the chlorodeoxysugar derivative is 4,1',6'-trichloro-4,1',6'-trideoxygalactosucrose.

14. The sweetened chewing gum composition according to claim 11, wherein the Polydextrose is Improved Polydextrose.

15. The sweetened chewing gum composition according to claim 11, wherein the synergistic sweetening composition is present in an amount up to about 50%, by weight of the chewing gum composition.

16. The sweetened chewing gum composition according to claim 11, wherein the gum base is present in an amount up to about 55%, by weight of the chewing gum composition.

17. The sweetened chewing gum composition according to claim 11, wherein the gum base is present in an amount from about 50% to about 85%, by weight of the chewing gum composition.

18. A sweetened confectionery composition which comprises an effective amount of a synergistic sweetening composition which consisting essentially polydextrose and a chlorodeoxysugar derivative, wherein the chlorodeoxysugar derivative is present in an amount from about 0.05% to about 0.5%, by weight of the synergistic sweetening composition.

19. The sweetened confectionery composition according to claim 18, wherein the chlorodeoxysugar derivative is selected from the group consisting of chlorodeoxysucrose derivatives, chlorodeoxygalactosucrose derivatives, and mixtures thereof.

20. The sweetened confectionery composition according to claim 19, wherein the chlorodeoxysugar derivative is 4,1',6'-trichloro-4,1',6'-trideoxygalactosucrose.

21. The sweetened confectionery composition according to claim 18, wherein the Polydextrose is Improved Polydextrose.

22. The sweetened confectionery composition according to claim 18, wherein the synergistic sweetening composition is present in an amount from about 50% to about 98%, by weight of the confectionery composition.

23. A method for preparing a synergistic sweetening composition consisting essentially of polydextrose and a chlorodeoxysugar derivative which comprises admixing polydextrose and a chlorodeoxysugar derivative, wherein the chlorodeoxysugar derivative is present in an amount from about 0.05% to about 0.5%, by weight of the synergistic sweetening composition.

24. A method for preparing a sweetened edible composition which comprises admixing an effective amount of a synergistic sweetening composition with a pharmaceutically acceptable carrier wherein the synergistic sweetening composition consisting essentially of polydextrose and a chlorodeoxysugar derivative, wherein the chlorodeoxysugar derivative is present in an amount from about 0.05% to about 0.5%, by weight of the synergistic sweetening composition.

25. A method for preparing a sweetened chewing gum composition which comprises
 (A) providing the following ingredients:
  (a) a gum base;
  (b) an effective amount of a synergistic sweetening composition which comprises polydextrose and a chlorodeoxysugar derivative, wherein the chlorodeoxysugar derivative is present in an amount from about 0.05% to about 0.5%, by weight of the synergistic sweetening composition; and
  (c) a flavoring agent;
 (B) melting the gum base;
 (C) admixing the synergistic sweetening composition with the melted gum base; and
 (D) forming the mixture from step (C) into suitable gum shapes.

26. A method for sweetening an edible composition which comprises adding to the edible composition an effective amount of a synergistic sweetening composition wherein the synergistic sweetening composition consisting essentially of polydextrose and a chlorodeoxysugar derivative, wherein the chlorodeoxysugar derivative is present in an amount from about 0.05% to about 0.5% by weight of the synergistic sweetening composition.

* * * * *